United States Patent
Mori et al.

(10) Patent No.: US 6,338,911 B1
(45) Date of Patent: Jan. 15, 2002

(54) MAGNETO-OPTICAL RECORDING MEDIUM

(75) Inventors: Go Mori, Nara; Naoyasu Iketani, Tenri; Michinobu Mieda, Shiki-gun; Akira Takahashi, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/429,082

(22) Filed: Oct. 29, 1999

(30) Foreign Application Priority Data

Oct. 29, 1998 (JP) .......................................... 10-308544

(51) Int. Cl.[7] ................................................ G11B 5/66
(52) U.S. Cl. ...................... 428/694 ML; 428/694 MM; 428/694 EC; 428/694 IS; 428/900; 369/13
(58) Field of Search ................. 428/694 ML, 694 MM, 428/694 EC, 694 IS, 900

(56) References Cited

U.S. PATENT DOCUMENTS 5,926,444 A    7/1999   Hirokane et al. .............. 369/13
6,261,707 B1 *  7/2001   Murakami ........... 428/694 ML

FOREIGN PATENT DOCUMENTS

| JP | 6150418 | 5/1994 |
|---|---|---|
| JP | 6290496 | 10/1994 |
| JP | 6-290496 | * 10/1994 |
| JP | 7114750 | 5/1995 |
| JP | 7-114750 | * 5/1995 |
| JP | 1040600 | 2/1998 |

* cited by examiner

Primary Examiner—Leszek Kiliman (57) ABSTRACT

A reproduction layer, a magnetic domain extending layer, an intermediate layer, and a recording layer are formed in this order. The magnetic domain extending layer, the intermediate layer, and the recording layer are exchange-coupled. The intermediate layer has a Curie temperature lower than that of any other magnetic layer. A non-magnetic intermediate layer is formed between the reproduction layer and the magnetic domain extending layer. Upon reproduction, magnetization information in the recording layer is transferred to and extended in the magnetic domain extending layer, where an extended magnetic domain is formed. The reproduction layer is magnetostatically coupled with the magnetic domain extending layer, so that the extended magnetic domain is transferred to the reproduction layer. This makes it possible to provide a magneto-optical recording medium characterized in moving of magnetic domain walls and extension of magnetic domains in good conditions, and increased signal intensity with a simpler structure.

19 Claims, 5 Drawing Sheets

MAGNETO-OPTICAL RECORDING MEDIUM

FIELD OF THE INVENTION

The present invention relates to a magneto-optical recording medium for recording/reproducing information with laser light by utilizing magneto-optical effects, and particularly relates to a magneto-optical recording medium in which each recording magnetic domain in a recording layer is extended and reproduced.

BACKGROUND OF THE INVENTION

A number of studies and examinations have been made to promote high-densification in magneto-optical recording by utilizing magneto-optical effects to achieve repeatedly-overwritable information recording media with further greater capacity.

In such magneto-optical recording media, arises a drawback in that reproduction characteristics deteriorate as the diameter of recording bits as recording-use magnetic domains and the distance of the recording bits become smaller relative to the beam diameter of light beam converged on a medium.

This stems from that each recording bit cannot be reproduced separately, since a beam spot of the light beam converged on one target recording bit falls also on adjacent recording bits.

To solve the foregoing problem, the configuration of a recording medium, the reproducing method, etc. have been innovated to increase the recording density, and as a result, the super high resolution reproduction, the magnetic domain extending reproduction utilizing the moving (displacement) of magnetic domain walls, and the like are proposed. Here, the super high resolution reproduction and the magnetic domain extending reproduction will be explained below.

First, super high resolution technology is explained as a technology to achieve high densification of a magneto-optical recording medium.

Figure 9:
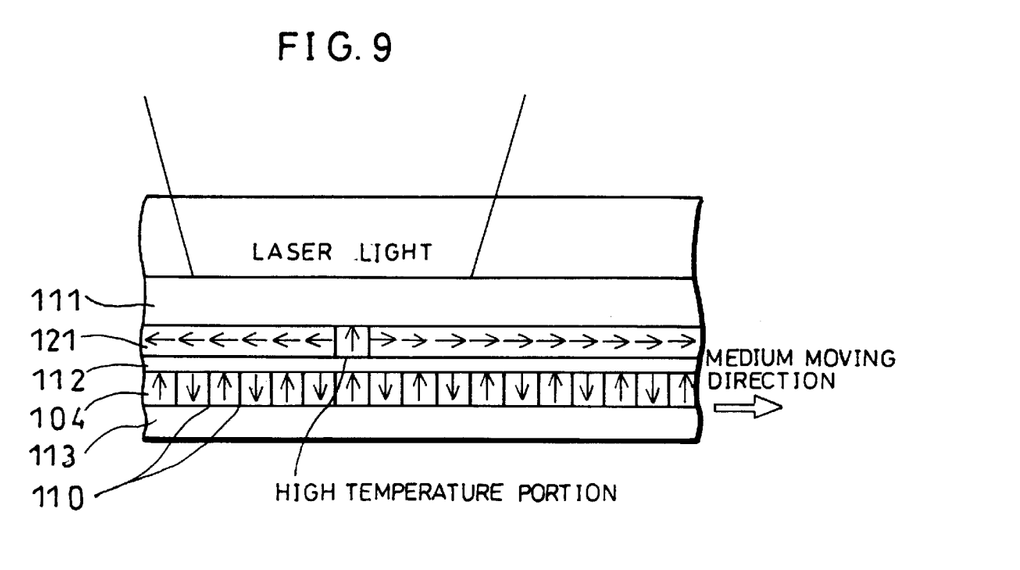
FIG. 9 is a schematic cross-sectional view explaining a principle of reproduction of a conventional super high resolution magneto-optical recording medium of a magnetostatic coupling type.

As shown in FIG. 9, according to the magnetostatic-coupling-type super high resolution technology disclosed by, for example, the Japanese Publication for Laid-Open Patent Application No. 40600/1998 (Tokukaihei 10-40600, Date of Publication: Feb. 13, 1998) and the Japanese Publication for Laid-Open Patent Application No. 150418/1994 (Tokukaihei 6-150418, Date of Publication: May 31, 1994), a medium has at least a reproduction layer 121, a non-magnetic intermediate layer 112, and a recording layer 104 in this order. Arrows in each magnetic layer represent directions of magnetizations. The reproduction layer 121 is prepared so as to be in an in-plain magnetization at room temperature and to be turned to a perpendicular magnetization state when temperature rises to above a certain critical temperature during reproduction. The exchange-coupling between the reproduction layer 121 and the recording layer 104 is broken by the presence of the non-magnetic intermediate layer 112.

No magneto-optical signal is generated in the reproduction layer 121 at room temperature since the reproduction layer 121 is in an in-plain magnetization state, but during reproduction, heated by a projected beam, only a central part of the beam spot of the medium (a part behind the beam spot center in the moving direction of the beam spot when the beam spot moves at a high linear speed) exhibits a perpendicular magnetization, only from which magneto-optical signals are generated. Let the part be called "aperture," and the reproduction layer 121 is magnetostatically coupled with the recording layer 104 only at the aperture area in accordance with a magnetic field generated by a recording magnetic domain in the recording layer 104, so that a magnetization direction thereof is determined according to the recording magnetic domain. Therefore, by this scheme, a recording magnetic domain can be selected and read only from the area of the aperture, thereby allowing a structure of micro magnetic domains, or high densification, of the magneto-optical recording medium.

The foregoing scheme, however, has a drawback in that a reproduction signal quantity decreases as the recording magnetic domains become smaller in size.

On the other hand, the magnetic domain extending reproduction is a scheme of reproduction by extending small recording magnetic domains, which ensures that a reproduction signal quantity great enough can be obtained even with small recording magnetic domains. The following description will explain the foregoing scheme, while referring to FIG. 10.

Figure 10:
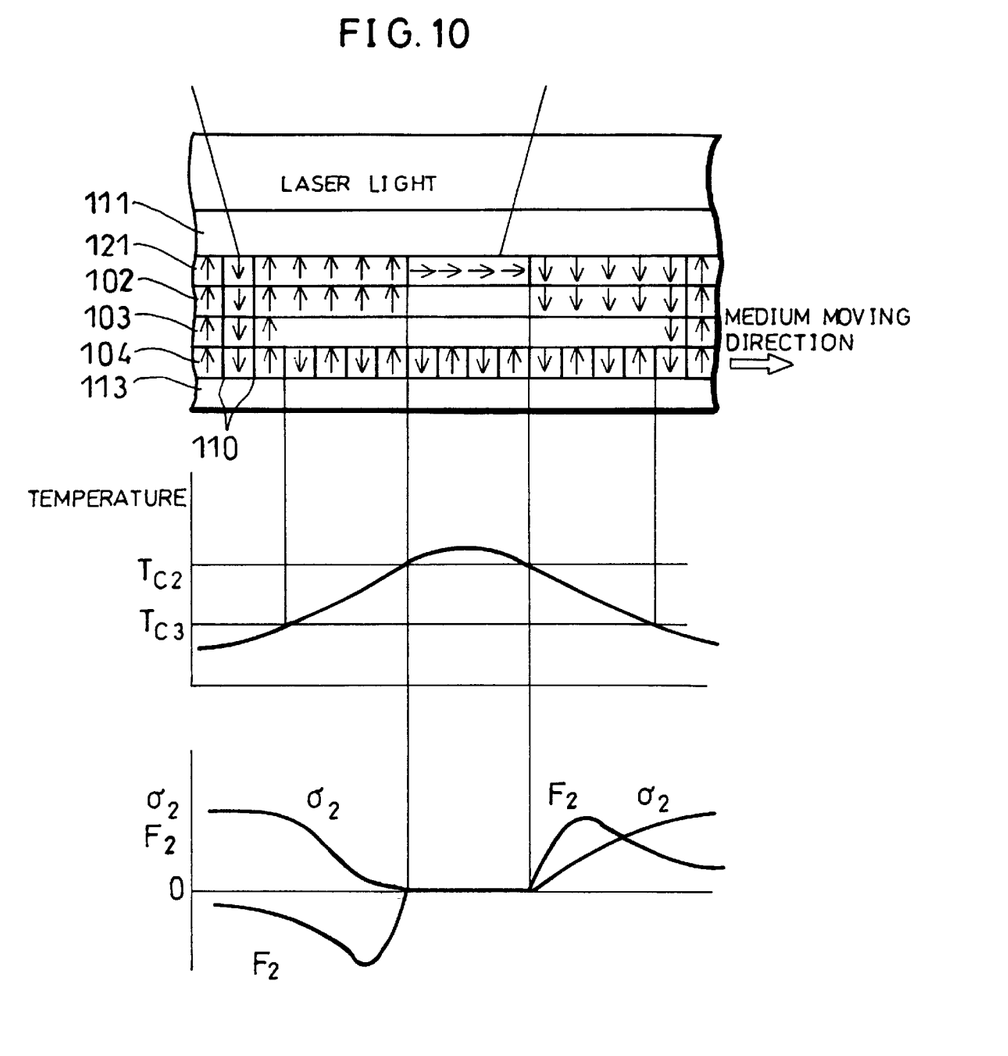
FIG. 10 is a schematic cross-sectional view explaining a principle of reproduction of a conventional magnetic domain extending magneto-optical recording medium of a magnetic domain wall moving type.

As shown in FIG. 10, magnetic films in a multi-layer structure are exchange-coupled thereby causing small recording magnetic domains in a recording layer 104 to be extended in a magnetic domain extending layer (displacement layer) 102 so that amplitudes of reproduction signals are increased, thereby resulting in that high-density recording is realized. This is disclosed by the Japanese Publication for Laid-Open Patent Application No. 114750/1995 (Tokukaihei 7-114750, Date of Publication: May 2, 1995). Incidentally, arrows in the layers represent directions of sub-lattice magnetizations of transition metals in the film, and in each layer are formed magnetic domain walls (Bloch walls) 110, each being present between adjacent magnetic domains having magnetizations in opposite directions.

To realize the magnetic domain extending reproduction, the following requirements have to be satisfied.

1. The recording layer 104 stably maintains small magnetic domains in a temperature range from room temperature to a temperature for reproduction.
2. At least in the vicinity of a Curie temperature Tc3 of the intermediate layer 103, the recording layer 104, the intermediate layer 103, and the magnetic domain extending layer 102 are exchange-coupled.
3. The intermediate layer 103 loses magnetic order when the temperature becomes higher than the foregoing Curie temperature Tc3, thereby breaking the exchange-coupling from the recording layer 104 to the magnetic domain extending layer 102 in a temperature range above the Curie temperature Tc3.
4. At a region where the foregoing exchange-coupling is broken, a magnetic domain wall 110 moves (is displaced) relative to a domain transferred by the exchange-coupling, since the frictional force due to magnetic domain wall coercivity in the magnetic domain extending layer 102 is small and a magnetic domain wall energy gradient is generated by a temperature gradient. As a result, the magnetization in the foregoing region is directed in the same direction as that transferred by the exchange-coupling.

The following description will explain in more detail the magnetic domain extending reproduction disclosed in Tokukaihei 7-114750, while referring to FIG. 10.

The moving of the magnetic domain wall is explained first.

A graph in the center of FIG. 10 shows the temperature distribution in the center of a track when a laser is projected on the optical recording medium which shifts rightward relative to the laser. Here, since the disk as the recording medium moves at a high linear speed, a portion where the film temperature becomes highest appears behind a center of a beam spot in the moving direction of the beam spot relative to the disk.

Further, a graph below in FIG. 10 shows distribution of a magnetic domain wall energy density σ2 in a radial direction in the magnetic domain extending layer 102. Normally, the magnetic domain wall energy density σ2 decreases as the temperature rises, becoming 0 at the Curie temperature or above. Therefore, in the case of the temperature gradient in the radial direction as shown in the graph in the center of FIG. 10, the magnetic domain wall energy density σ2 decreases to a level corresponding to the Curie temperature, as shown in the graph below in the same figure.

Here, a force F2 expressed by the following formula shown below is exerted to magnetic domain walls 110 in each layer at a position x in the radial direction:

$$F2=-d\sigma2/dx$$

Since the force F2 is exerted so as to move the magnetic domain walls 110 toward where the magnetic domain wall energy is lower and the magnetic domain extending layer 102 has a smaller frictional force due to coercivity of the magnetic domain wall 110 compared with the other magnetic layers thereby having greater magnetic domain wall mobility, the magnetic domain wall therein is moved by the force F2 toward where the magnetic domain wall energy is lower, when the exchange-coupling force from the intermediate layer 103 is broken.

Next, the following description will explain the magnetic domain expansion.

In FIG. 10, in a portion on the disk before the laser light is projected, i.e., a portion at room temperature, the three magnetic layers are exchange-coupled, so that the magnetic domains recorded in the recording layer 104 are transferred to the magnetic domain extending layer 102. Here, the magnetic domain walls 110 are present in each layer, each being between adjacent magnetic domains having magnetizations of directions opposite to each other.

Where the film temperature is not lower than the Curie temperature Tc3 of the intermediate layer 103, the magnetization of the intermediate layer 103 disappears thereby breaking the exchange-coupling between the magnetic domain extending layer 102 and the recording layer 104. As a result, the magnetic domain extending layer 102 is no longer capable of keeping the magnetic domain wall 110, letting the magnetic domain wall 110 move to a high-temperature side according to the force F2 exerted to the magnetic domain wall 110. Here, the speed of movement of the magnetic domain wall 110 is sufficiently higher than the moving speed of the medium. Therefore, a larger magnetic domain than that recorded in the recording layer 104 is transferred to the magnetic domain extending layer 102. The extended magnetic domain is further transferred to the reproduction layer 121 by means of the exchange-coupling force.

The foregoing magnetic domain extending reproduction has the following drawbacks, however. Namely, in the magnetic domain extending reproduction, magnetic characteristics have to be adjusted, since magnetic domains are transferred to the reproduction layer 121 by exchange-coupling with the magnetic domain extending layer 102. Here, since transfer of a recording magnetic domain is carried out by exchange-coupling all the magnetic layers from the recording layer 104 to the reproduction layer 121, adjustment of magnetic characteristics of the respective layers becomes more difficult as the multi-film structure becomes complicated.

Besides, though the magnetic domain wall 110 has to be smoothly moved in a region in which the exchange-coupling of the magnetic domain extending layer 102 with the recording layer 104 through the intermediate layer 103 is broken, to satisfy both the requirements of the movement of the magnetic domain wall 110 and the exchange-coupling transfer to the reproduction layer 121 at the same time is very difficult.

Moreover, there arises a drawback in that the movement of the magnetic domain wall 110 is obstructed since an exchange force from the reproduction layer 121 is exerted to the magnetic domain extending layer 102.

Incidentally, in the aforementioned super high resolution medium of a magnetostatic coupling type (see FIG. 9), magnetization information of small recording magnetic domains are transferred to the reproduction layer 121 by magnetostatic coupling. In so doing, the magnetostatic coupling has to be realized by use of a very small magnetic field generated by a small recording magnetic domain, and therefore, it is necessary to provide the recording layer 104 and the reproduction layer 121 closest possible to each other unless becoming exchange-coupled. Therefore, the non-magnetic intermediate layer 112 is not allowed to be thick, and the thickness thereof is strictly limited in a range such that the exchange-coupling is broken while the magnetostatic coupling is realized.

SUMMARY OF THE INVENTION

The object of the present invention is to provide a magneto-optical recording medium in which smooth moving of magnetic domain wall and extension of magnetic domains are realized, and further, which is capable of increasing signal intensity with a simpler structure.

To achieve the foregoing object, a magneto-optical recording medium of the present invention is characterized in including (1) a recording layer in which a plurality of recording magnetic domains are formed, (2) a first exchange-coupling breaking layer for breaking exchange-coupling with the recording layer at a temperature not lower than a predetermined temperature, (3) a magnetic domain extending layer in which upon breaking of exchange-coupling with the recording layer, a magnetic domain wall moves to a higher-temperature side so that an extended magnetic domain is formed, and (4) a second exchange-coupling breaking layer for breaking exchange-coupling between the magnetic domain extending layer and a reproduction layer, while making the two layers magnetostatically coupled.

With the foregoing arrangement, when the first exchange-coupling breaking layer is at a temperature lower than the predetermined temperature, the recording layer and the magnetic domain extending layer are exchange-coupled, and recording magnetic domains in the recording layer are transferred to the magnetic domain extending layer. On the other hand, when being heated to a predetermined temperature or above, the exchange-coupling between the recording layer and the magnetic domain extending layer is broken by the first exchange-coupling breaking layer. The magnetic domain extending layer is thus no longer exchange-coupled with the recording layer, losing magnetic order. As a result, the magnetic domain extending layer becomes unable to maintain magnetic domain walls, letting the magnetic domain walls move to a higher temperature side from positions at a magnetic domain already transferred by the foregoing exchange-coupling. As a result, the magnetic domain transferred is extended to the higher temperature side, whereby an extended magnetic domain is formed.

The exchange-coupling between the magnetic domain extending layer and the reproduction layer is broken by the second exchange-coupling breading layer, while the reproduction layer and the magnetic domain extending layer are magnetostatically coupled. This magnetostatic coupling causes magnetic flux generated from the extended magnetic domain formed in the magnetic domain extending layer to reach the reproduction layer, causing the extended magnetic domain to be transferred to the reproduction layer.

With the foregoing magnetostatic coupling between the reproduction layer and the magnetic domain extending layer, restrictions on the magnetic characteristics in the transfer of the extended magnetic domains from the magnetic domain extending layer to the reproduction layer are eased. In other words, since magnetic domain walls in the magnetic domain extending layer are smoothly moved while never being affected by the exchange-coupling force from the reproduction layer, restrictions on material selection of each layer are eased. In addition, the reproduction layer is no longer subjected to the restrictions on the magnetic characteristics relating to the exchange-coupling, either, and therefore, a material having excellent reproduction signal characteristics can be selected as material for forming the reproduction layer.

Incidentally, in the conventional super high resolution medium of a magnetostatic coupling type wherein each small magnetic domain is transferred in substantially the same size by magnetostatic coupling and magnetic domains surrounding it have to be masked, a reproduction region in the reproduction layer has to be limited to a very small area. In contrast, in the present magneto-optical recording medium, since an extended magnetic domain in the magnetic domain extending layer is transferred to the reproduction layer, a reproduction region of the reproduction layer can be made larger, and a reproduction signal with a greater amplitude can be obtained therefrom.

Furthermore, in the conventional super high resolution medium of a magnetostatic coupling type, the recording layer and the reproduction layer have to be made as close as possible unless they become exchange-coupled, since magnetostatic coupling is realized by using a very small magnetic field generated by a small magnetic domain. In contrast, in the present magneto-optical recording medium, since a large magnetic field is generated from the extended magnetic domain in the magnetic domain extending layer, the restriction on the distance between the recording layer and the reproduction layer is remarkably eased, thereby enabling to form the second exchange-coupling breaking layer thicker to some extent. This further makes it possible to use both the Kerr effect and the Faraday effect of the reproduction layer, and even to obtain reproduction signals with further greater amplitudes, by optimizing multiple interference of light.

As described above, in the case of the present magneto-optical recording medium wherein extended magnetic domains are transferred to the reproduction layer and reproduction signals with great amplitudes are obtained, even with an increase in a linear recording density, reliable reproduction signals with sufficiently great amplitudes can be obtained, not being easily affected by noise.

The foregoing magneto-optical recording medium may be further arranged so that the reproduction layer and the magnetic domain extending layer are made of rare earth-transition metals, and that at least in a temperature range from room temperature to a Curie temperature of the magnetic domain extending layer, the reproduction layer and the magnetic domain extending layer have sub-lattice magnetizations with a same polarity.

According to the foregoing arrangement, since the reproduction layer and the magnetic domain extending layer are magnetostatically coupled, their magnetizations are directed in the same direction. Further, since the sub-lattice magnetizations in the foregoing two layers have the same polarity in the foregoing temperature range, the sub-lattice magnetizations of the layers are also directed in the same direction. With this, rotational angles of polarized lights obtained by three magneto-optical effects of the Kerr effect and the Faraday effect of the reproduction layer and the Kerr effect of the magnetic domain extending layer are directed in the same direction. As a result, a further greater rotational angle is obtained, and hence, reproduction signals with greater amplitudes can be obtained.

For a fuller understanding of the nature and advantages of the invention, reference should be made to the ensuing detailed description taken in conjunction with the accompanying drawings.

DESCRIPTION OF THE PREFERRED EMBODIMENTS

First of all, a basic structure of a magneto-optical recording medium of the present invention will be explained below.

Figure 1:
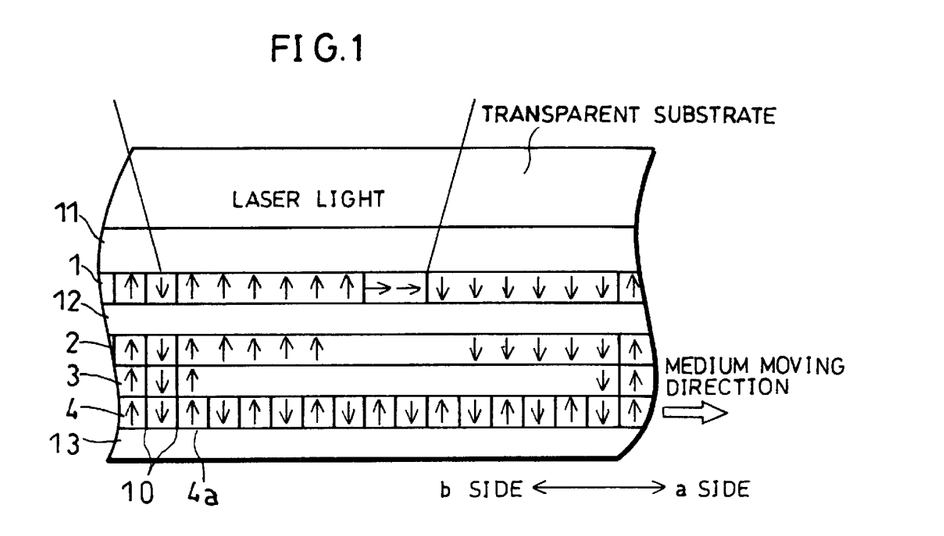
FIG. 1 is a schematic cross-sectional view illustrating a magneto-optical recording medium in accordance with a first embodiment of the present invention.

FIG. 1 is a schematic cross-sectional view illustrating a magneto-optical recording medium of the present invention. In the magneto-optical recording medium, a first interference layer 11 (first transparent dielectric layer), a reproduction layer 1 (first magnetic layer), a second interference layer 12 (second transparent dielectric layer, non-magnetic intermediate layer, second exchange-coupling breaking layer), a magnetic domain extending layer (displacement layer) 2 (second magnetic layer), an intermediate layer 3 (third magnetic layer, first exchange-coupling breaking layer), a recording layer 4 (fourth magnetic layer), and a protective layer 13 are laminated in this order. Arrows in each layer represent directions of sub-lattice magnetizations of a transition metal. Magnetic domain walls (Bloch wall) 10 are formed in each magnetic layer so that each magnetic domain wall 10 is present between adjacent magnetic domains having magnetization directions opposite to each other.

The magneto-optical recording medium shown in FIG. 1, differing from the prior art shown in FIG. 10, has the second interference layer 12 between the reproduction layer 1 and the magnetic domain extending layer 2. The second interference layer 12, composed of a transparent dielectric film, breaks exchange-coupling between the reproduction layer 1 and the magnetic domain extending layer 2 while realizes magnetostatic coupling between the magnetic domain extending layer 2 and the reproduction layer 1.

In such a medium, as in the prior art, the transfer of recording magnetic domains from the recording layer 4 to the magnetic domain extending layer 2 is realized by exchange coupling in a temperature range from room temperature to a Curie temperature Tc3 of the intermediate layer 3, while in a region at a temperature of Tc3 or above, a recording magnetic domain 4a which is heated to the vicinity of the temperature Tc3 is extended by the moving of magnetic domain walls and is transferred to the magnetic domain extending layer 2. As a result, an extended magnetic domain is formed in the magnetic domain extending layer 2.

Then, since the magnetic domain extending layer 2 and the reproduction 1 are magnetostatically coupled in the present invention, magnetic flux generated by the foregoing extended magnetic domain in the magnetic domain extending layer 2 causes an extended magnetic domain to be formed in the reproduction layer 1.

In the foregoing magneto-optical recording device of the present invention, not a small recording magnetic domain is transferred to the reproduction layer 1, but a magnetic domain already extended is transferred by magnetostatic coupling. Therefore, a perpendicular magnetization region of the reproduction layer 1 is allowed to be wide.

More specifically, in a conventional super high resolution medium of a magnetostatic coupling type (see FIG. 9), a small magnetic domain is transferred in substantially the same size by magnetostatic coupling, while neighboring magnetic domains have to be masked. Therefore, an area in a perpendicular magnetization state has to be limited so as to be small.

In the magneto-optical recording medium of the present invention, however, the area in the perpendicular magnetization state in the reproduction layer 1 needs not be narrowed, since a magnetic domain which has already been extended upon transfer is further transferred. In other words, a magnetic domain already extended can be transferred to the reproduction layer 1, and hence a reproduction signal having a great amplitude can be obtained.

Furthermore, in the conventional super high resolution medium of a magnetostatic coupling type, the recording layer and the reproduction layer have to be made as close as possible unless they become exchange-coupled, since magnetostatic coupling is realized by using a very small magnetic field generated by a small magnetic domain (for example, the non-magnetic intermediate layer between the recording layer and the reproduction layer is formed not more than 10 nm in thickness).

In contrast, in the present arrangement, the second interference layer 12 can be formed thick to some extent, since the transfer is carried out by utilizing a great magnetic field generated by a magnetic domain already extended by the magnetic domain extending layer 2. This enables utilization of both the Kerr effect and the Faraday effect of the reproduction layer 1, and moreover, optimization of multiple interference of light, whereby a reproduction signal with a great amplitude can be obtained.

Furthermore, the optimal film thickness of the second interference layer 12 is determined depending on refractive indices and materials of the reproduction layer 1, the magnetic domain extending layer 2, and the second interference layer 12. In the conventional arrangement, such a combination of the reproduction layer 1, the magnetic domain extending layer 2, and the second interference layer 12 that may requires thickening of the second interference layer 12 for optimization of multiple interference cannot be used. In contrast, since the acceptable range of the film thickness of the second interference layer 12 is broadened in the present invention, various combinations of the reproduction layer 1, the magnetic domain extending layer 2, and the second interference layer 12 can be used.

The following description will depict concrete embodiments wherein the present invention is applied, while referring to the drawings.

[First Embodiment]

① Structure of Magneto-optical Recording Medium

As shown in FIG. 1, the first interference layer 11 (first transparent dielectric layer), the reproduction layer 1 (first magnetic layer), the second interference layer 12 (second transparent dielectric layer, non-magnetic intermediate layer), the magnetic domain extending layer 2 (second magnetic layer), the intermediate layer 3 (third magnetic layer), the recording layer 4 (fourth magnetic layer), and the protective layer 13 are laminated in this order on a transparent substrate.

To form the transparent substrate, glass, polycarbonate, norbornane-based resin, etc. may be used. Each layer of the foregoing magnetic layers and transparent dielectric layers may be deposited by continuous sputtering by use of a sputtering device or by vacuum vapor deposition. In the case of the magnetic layers particularly, exchange-coupling therebetween is realized by continuous film formation without breaking vacuum.

The first interference layer 11 and the second interference layer 12, which are aimed at enhancing the magneto-optical effects by multiple interference and protecting the magnetic layers, are formed with a transparent dielectric material such as $Si_3N_4$, AlN, AlSiN, $SiO_2$, SiO, ZnS, or $MgF_2$. The first interference layer 11 and the second interference layer 12 are preferably formed with a common material with view to higher efficiency in film formation, but they may be formed with different materials as long as the effects of multiple interference can be achieved.

It is possible to form the protective layer 13 for protection of the magnetic layers with the same material as that used to form the interference layers, but since it optically affects less, the material is not particularly limited as long as it is suitable for optimization of thermal characteristics and protection of the magnetic layers.

Arrows in each layer in FIG. 1 represent directions of sub-lattice magnetizations of a transition metal in each film, and magnetic domain walls (Bloch wall) 10 are formed in each magnetic layer so that each magnetic domain wall 10 is present between adjacent magnetic domains having magnetization directions opposite to each other.

The recording layer 4 is made of a material having perpendicular magnetization anisotropy and a coercive force which are great enough to form small recording bits and to stably maintain the recording bits thus formed; a rare earth-transition metal amorphous alloy such as TbFeCo, DyFeCo, or TbDyFeCo. Recording information is stored in forms of upward or downward directions in each magnetic domain in the recording layer 4. Alternatively, the recording layer 4 may be formed with a perpendicular magnetization film made of any one of garnets, Pt/Co, Pd/Co, or the like, so that information can be magnetically transferred to another layer. Incidentally, a coercive force of the recording layer 4 at room temperature is greater than that of the reproduction layer 1 at room temperature as well as greater than that of the magnetic domain extending layer 2 at room temperature as will be described later.

The intermediate layer 3 is a perpendicular magnetization film made of, like the other magnetic layers, a rare earth-transition metal amorphous alloy, having a Curie temperature Tc3 of around 70° C., which is lower than that of any other magnetic layer. The intermediate layer 3 is exchange-coupled with the recording layer 4 at a temperature not higher than the Curie temperature Tc3. To form the intermediate layer 3, a material having a low Curie temperature is used, for example, TbFeCo, TbFeAl, TbDyFeAl, or DyFeAl. In the case where a non-magnetic additional element is used, it is not limited to Al, but it may be another element such as Cu.

The magnetic domain extending layer 2 is made of a rare earth-transition metal amorphous alloy having a small perpendicular magnetization anisotropy, such as GdCo, GdFeCo, GdFe, or NdGdFeCo, or a bubble-memory-use material such as garnet, so as to have a small frictional force due to magnetic domain wall coercivity and a greater magnetic domain wall mobility as compared with those of the other magnetic layers. The Curie temperature thereof (Tc2: second critical temperature) is set lower than the highest temperature achieved upon heating during reproduction.

To form the reproduction layer 1, a rare earth-transition metal amorphous alloy, such as GdCo, GdFeCo, TbFeCo, DyFeCo, GdTbFeCo, GdDyFeCo, or TbDyFeCo is preferably used. To increase a Kerr rotational angle at a short wavelength, a light rare earth metal such as Nd, Pr, or Sm may be added to the foregoing material. Alternatively, a platinum group-iron group multi-layer film, for example, Pt/Co, or Pd/Co may be used.

Composition of the reproduction layer 1 is adjusted so that rare earth element sub-lattice magnetization is dominant at room temperature and has a perpendicular magnetization at room temperature, and makes transition to an in-plane magnetization at a certain temperature (first critical temperature) or above. In the perpendicular magnetization state, the coercive force is small so that the magnetization direction is directed according to the magnetization direction of the magnetic domain extending layer 2 by magnetostatic coupling.

In the present embodiment, since light having been transmitted through the reproduction layer 1 is also utilized, the reproduction layer 1 preferably has such a thickness as to realize the perpendicular magnetization state and to transmit light, namely, about 20 nm. Further, to obtain good signal characteristics, the Curie temperature of the reproduction layer 1 is set higher than those of the magnetic domain extending layer 2 and the recording layer 4.

The first interference layer 11 is preferably about 70 nm in thickness, the reproduction layer 1, about 20 nm, the second interference layer 12, about 20 nm, the magnetic domain extending layer 2, about 30 nm, the intermediate layer 3, about 10 nm, the recording layer 4, about 30 nm, and the protective layer 13, about 20 nm. These thicknesses are mere examples, and are not limited to these as long as the contents of the present embodiment as described herein are achieved.

Furthermore, it is possible to adjust thermal characteristics by adding a metal layer made of Al, an Al alloy such as AlTa, AlTi, or AlCr, or Cu to the foregoing structure. Further, a protective coat made of a polymer resin may be added. Substrates on which films are completed may be combined by adhering to each other.

② Recording/Reproduction Operation

Recording of data signals to the present magneto-optical recording medium is carried out by, while moving the medium, either (i) projecting a laser light with a power causing the recording layer 4 to have a temperature in the vicinity of the Curie temperature Tc4 while modulating an external magnetic field, or (ii) applying a magnetic field in a constant direction while modulating a laser power. In the latter case, by adjusting the intensity of the laser light so that only a desired region in the light spot is heated to the temperature Tc4, a recording magnetic domain having a diameter smaller than the beam spot diameter can be formed, resulting in that signals of periods below the diffraction threshold of light can be recorded.

The following description will explain a reproducing operation.

In FIG. 1, the three magnetic layers (the recording layer 4, the intermediate layer 3, and the magnetic domain extending layer 2) are exchange-coupled in a part to which laser light has not yet been projected, i.e., a part at room temperature, and magnetic domains recorded in the recording layer 4 are transferred to the magnetic domain extending layer 2. Here, magnetic domain walls 10 are formed in each layer so that each magnetic domain wall 10 is present between adjacent magnetic domains having magnetization directions opposite to each other.

In a part heated to a temperature not lower than the Curie temperature Tc3 of the intermediate layer 3, the magnetization of the intermediate layer 3 disappears thereby breaking the exchange-coupling between the magnetic domain extending layer 2 and the recording layer 4. Therefore, the magnetic domain extending layer 2 loses a force for maintaining the magnetic domain wall 10, thereby letting the magnetic domain wall 10 move to a high temperature side according to the force F2 exerted to the magnetic domain wall 10. Here, the moving speed of the magnetic domain wall 10 is sufficiently higher as compared with the moving speed of the medium. Therefore, a magnetic domain transferred to the magnetic domain extending layer 2 is greater in size than the magnetic domain stored in the recording layer 4.

When the extended magnetic domain is obtained in the magnetic domain extending layer 2 as described above, a magnetostatic coupling magnetic field is generated which affects the reproduction layer 1, thereby forming an extended magnetic domain in the reproduction layer 1. Then, information is read from the extended magnetic domain. Incidentally, since the reproduction layer 1 is in a perpendicular magnetization state at room temperature and makes transition into an in-plain magnetization state when the temperature rises beyond a certain level, a portion thus heated by the reproduction beam has an in-plane magnetization, generating no magneto-optical signal, in contrast with the conventional super high resolution reproduction of magnetostatic coupling type (see FIG. 9).

Incidentally, as described above, the reproduction layer 1 and the magnetic domain extending layer 2 have their magnetization directions directed in the same direction by magnetostatic coupling. Therefore, by making the reproduction layer 1 and the magnetic domain extending layer 2 have the same polarity of the sub-lattice magnetization of the rare earth-transition metal at least in a temperature range from room temperature to the Curie temperature of the magnetic domain extending layer 2, sub-lattice magnetizations are directed in the same direction in the two layers. For example, in the first embodiment, the reproduction layer 1 and the magnetic domain extending layer 2 are both made to have compositions such that the sub-lattice magnetization of the rare earth metal is dominant in the foregoing temperature range. With this, rotational angles of polarized lights obtained by magneto-optical effects available because of multiple interference in the present embodiment are directed in the same direction, the magneto-optical effects being the three effects of the Kerr effect of the reproduction layer 1, the Faraday effect of the reproduction layer 1, and the Kerr effect of the magnetic domain extending layer 2. As a result, a further greater rotational angle is obtained, and hence, a reproduction signal with a greater amplitude can be obtained.

As described above, in the case where the magneto-optical recording medium in the present embodiment is used, the magnetic domain 4a at around a front edge of the beam spot, heated to the vicinity of the temperature Tc3, is extended in the beam spot, transferred, and reproduced, thereby ensuring reproduction with reproduction signals having great amplitudes. Therefore, sufficiently great reproduction signals can be obtained, not depending on the optical diffraction threshold even when the linear recording density is increased.

Besides, by setting the Curie temperature Tc1 of the reproduction layer 1 higher than the Curie temperature Tc4 of the recording layer 4 (Tc1>Tc4), a greater Kerr rotational angle and a greater Faraday rotational angle can be obtained.

Moreover, by setting the Curie temperature Tc1 of the reproduction layer 1 higher than the Curie temperature Tc2 of the magnetic domain extending layer 2 (Tc1>Tc2), a greater Kerr rotational angle and a greater Faraday rotational angle compared with a comparative example 1 (described later) wherein no reproduction layer 1 is provided can be obtained, and excellent reproduction signal characteristics can be obtained.

Furthermore, in obtaining an extended magnetic domain in the magnetic domain extending layer 2, the magnetic domain 4a heated to the vicinity of the Curie temperature Tc3 of the intermediate layer 3 is extended, and the track has two portions heated to the temperature Tc3 on both sides with respect to the center of the temperature distribution, i.e., ahead in the medium moving direction (hereinafter referred to as a side) and on the opposite side (hereinafter referred to as b side), from which the magnetic domain walls 10 move to a high temperature area.

In the present embodiment, since the magnetic domain extending layer 2 is prepared so as to, upon the magnetic domain wall moving, lose the magnetic order at a region at the highest temperature during reproduction (not lower than the second critical temperature (Tc2)), only an extended magnetic domain on the b side (behind in the medium moving direction) falls in the beam spot among the extended magnetic domains transferred to the reproduction layer 1, while the magnetic domain wall 10 moving from the a side (ahead in the medium moving direction) does not fall in the beam spot. Accordingly, this makes it possible that during reproduction, only one recording magnetic domain in the beam spot is selected, extended, transferred, and read in any case.

Furthermore, in the region where the magnetic domain extending layer 2 has no magnetization at a temperature not lower than the temperature Tc2, there is no magnetic field generated, thereby causing no magnetostatic coupling. Therefore, in the case where the reproduction layer 1 exhibits a perpendicular magnetization state in the region, the magnetization thereof is directed at random upward and downward, thereby causing noises to the signals. In the present embodiment, in contrast, since the reproduction layer 1 is arranged so as to become in an in-plane magnetization state in a region at the temperature Tc2 or above so that magneto-optical signals are masked, noises unnecessary in reproduction can be suppressed.

So far the moving of magnetic domain walls has been described with a cross-section in the vicinity of the center of the track taken into consideration, but since an actual track has a certain width and a temperature gradient is generated in the disk radial directions, it is necessary to consider the moving of magnetic domain walls in the directions. When magnetic domain walls move in the disk radial directions and a recording magnetic domain in an adjacent track is extended, cross-talk, or signal interference, increases. To suppress this, the moving of magnetic domain walls has to be limited so that the magnetic domain walls do not go over the track borders.

To solve the foregoing problem, a guiding groove in a rectangular shape which is generally used for identification of a track in a magneto-optical recording medium may be formed deeper compared with the conventional cases, namely, about 100 nm or more in depth. For example, information may be recorded/reproduced to/from lands as information tracks, and the tracks are separated from one another by grooves. In this arrangement, the magnetic layers laminated on the lands are also separated by the grooves. Alternatively adaptable is an arrangement wherein information is recorded/reproduced to/from grooves as information tracks and the tracks are separated by lands, or an arrangement wherein information is recorded on both the lands and grooves which are separated by guiding groove borders, that is, edges. Actually, the magnetic layers join with each other since more or less films are laminated on the edges as well, but since the thickness there is much smaller than that in the other parts, the magnetic coupling at the guiding groove edges is ignorable.

Alternatively, to limit the moving of the magnetic domain wall in the disk radial direction, in the case where guiding grooves on the substrate have a U-shaped cross section, a high-power laser is projected to magnetic layers on the guiding grooves for annealing to change magnetic characteristics thereof, so as to change the film into an in-plain magnetized film or the like. As a result, tracks are magnetically separated.

As described above, by magnetic separation between adjacent tracks, magnetic domain walls by no means move beyond borders to adjacent tracks though recording magnetic domains can be extended to the full width of the track. Therefore, the magnetic domains are extended in the disk radial direction within the track width, and cross-talk (signal interference) between recording magnetic domains on adjacent tracks can be eliminated. Further, since this does not entail generation and elimination of magnetic domain walls at borders between adjacent tracks, the magnetic domain walls 10 easily move in the track directions.

Furthermore, the movement of the magnetic domain walls 10 can be smoothened by, in producing the magneto-optical recording medium of the present invention, after formation of the first interference layer 11, heating the film surface and projecting Ar ions thereto, or sputtering Ar thereto and etching the surface, so as to smoothen the surface. With this, the linear speed of the medium can be set further higher.

③ Concrete Examples

The following description will depict the outcome of measurements of aforementioned concrete characteristics of a magneto-optical recording medium of the first embodiment.

EXAMPLE 1

A medium was produced so as to have: a first interference layer 11 made of AlN, 70 nm thick; a reproduction layer 1 made of GdFeCo, 20 nm thick, having a Curie temperature Tc1 higher than 300° C.; a second interference layer 12 made of AlN, 20 nm thick; a magnetic domain extending layer 2 made of GdFeCo, 30 nm thick, having a Curie temperature Tc2 of 160° C.; an intermediate layer 3 made of TbFeCo, 10 nm thick, having a Curie temperature Tc3 of 70° C.; a recording layer 4 made of TbFeCo, 30 nm thick, having a Curie temperature Tc4 of 230° C.; and a protective layer 13 made of AlN, 20 nm thick.

Comparative Example 1

For comparison, a medium as a comparative example 1 was produced in the same structure as that of Example 1 except that the reproduction layer 1 and the second interference layer 12 are omitted, that is, so as to have: a first interference layer 11 made of AlN, 70 nm thick; no reproduction layer 1; no second interference layer 12; a magnetic domain extending layer 2 made of GdFeCo, 30 nm thick, having a Curie temperature Tc2 of 160°; an intermediate layer 3 made of TbFeCo, 10 nm thick, having a Curie temperature Tc3 of 70° C.; a recording layer 4 made of TbFeCo, 30 nm thick, having a Curie temperature Tc4 of 230° C.; and a protective layer 13 made of AlN, 20 nm thick.

Comparative Example 2

For comparison, a medium as a comparative example 2 was produced in the same structure as that of Example 1 except that the second interference layer 12 is omitted, that is, so as to have: a first interference layer 11 made of AlN, 70 nm thick; a reproduction layer 1 made of GdFeCo, 20 nm thick, having a Curie temperature Tc1 higher than 300° C.; no second interference layer 12; a magnetic domain extending layer 2 made of GdFeCo, 30 nm thick, having a Curie temperature Tc2 of 160°; an intermediate layer 3 made of TbFeCo, 10 nm thick, having a Curie temperature Tc3 of 70° C.; a recording layer 4 made of TbFeCo, 30 nm thick, having a Curie temperature Tc4 of 230° C.; and a protective layer 13 made of AlN, 20 nm thick.

Evaluation was conducted with use of an evaluator with a laser wavelength of 680 nm.

First of all, mark length dependency of carrier-to-noise ratios (C/N ratios, CNR) was examined (see FIG. 2) on Example 1, Comparative Example 1, and Comparative Example 2, in the case where recording magnetic domains of 0.5 μm to 0.2 μm in recording magnetic domain length were recorded at spaces equal to the recording magnetic domain length (at a duty of 50%).

Figure 2:
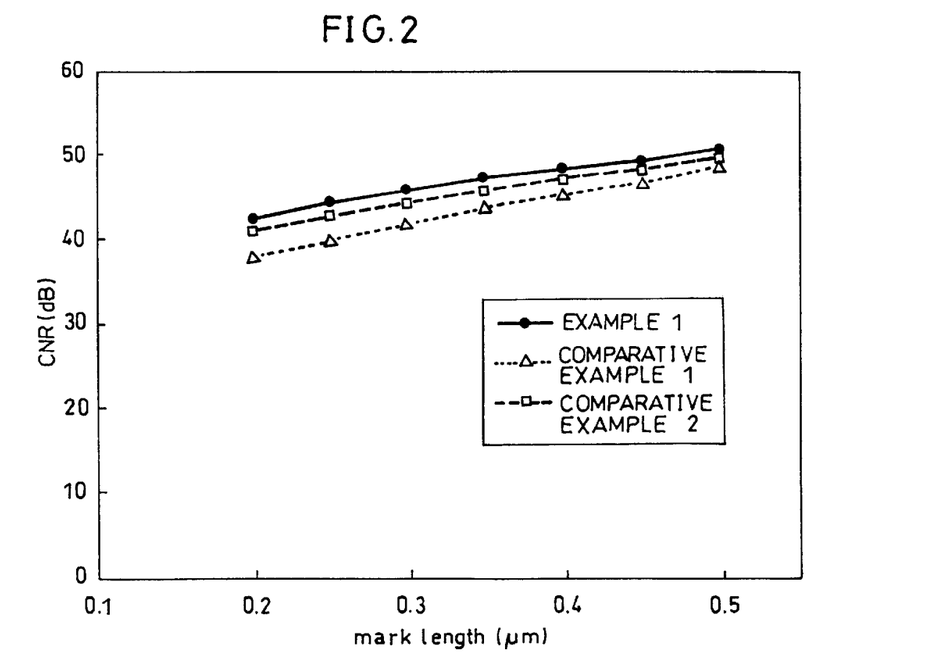
FIG. 2 is a view illustrating an outcome of evaluation on reproduction characteristics of the magneto-optical recording medium in accordance with the first embodiment of the present invention.

As shown in FIG. 2, from the magneto-optical recording medium of Example 1, a CNR of more than 40 dB as reproduction characteristic was obtained even in the case where the recording magnetic domain length was 0.2 μm.

Here, samples differing in thickness of the second interference layer 12, which varied from 0 nm to 100 nm, were also produced and examined. The outcome of evaluation of signal characteristics in the case where the recording magnetic domain was 0.2 μm in length is shown in Table 1 below.

TABLE 1

| FILM THICKNESS OF SECOND INTERFERENCE LAYER 12 (nm) | C/N (dB) | REMARKS |
| --- | --- | --- |
| 0 | 38.0 | COMPARATIVE EXAMPLE 1 (WITHOUT REPRODUCTION LAYER) |
| 0 | 41.0 | COMPARATIVE EXAMPLE 2 |
| 1 | 41.5 | |
| 5 | 41.5 | |
| 10 | 42.0 | |
| 20 | 42.5 | EXAMPLE 1 |
| 30 | 42.0 | |
| 50 | 41.5 | |
| 70 | 38.0 | |
| 100 | 28.0 | |

The result of evaluation shows that in the case of Example 1, a maximum C/N was about 1.5 dB higher, and an adequate range of reproduction power for obtaining a C/N of not less than 40 dB was about 10 percent broader, as compared with Comparative Example 2. Besides, reproduction signal characteristics superior to those in the conventional cases were obtained when the second interference layer 12 had a film thickness in a range of 1 nm to 50 nm.

Differences between Example 1 and Comparative Example 2 can be explained as below.

In Comparative Example 2, exchange-coupling is utilized to transfer an extended magnetic domain in the magnetic domain extending layer 2 to the reproduction layer 1. To ensure such transfer by exchange-coupling, each layer has to be adjusted in terms of magnitude of magnetization, magnetic domain wall energy, etc. In other words, for transfer, the reproduction layer 1 and the magnetic domain extending layer 2 are both limited in terms of material composition. Besides, the magnetic domain extending layer 2 has to realize smooth moving of magnetic domain walls in a region where the exchange-coupling from the recording layer 4 through the intermediate layer 3 thereto is broken, but it is very difficult to meet the requirement of simultaneously conducting the moving of the magnetic domain walls 10 and the transfer to the reproduction layer 1 by exchange-coupling. Thus, in the case of Comparative Example 2, selection of materials for respective layers and adjustment of compositions are very difficult, thereby making it difficult to obtain superior reproduction signal characteristics.

On the other hand, in Example 1, since the second interference layer 12 is provided between the magnetic domain extending layer 2 and the reproduction layer 1, transfer from the magnetic domain extending layer 2 to the reproduction layer 1 can be realized by magnetostatic coupling, thereby easing the limitation on magnetic characteristics relating to the magnetic domain transfer from the magnetic domain extending layer 2 to the reproduction layer 1. More specifically, the moving of magnetic domain walls can be smoothly carried out without being affected by an exchange force from the reproduction layer 1, and with this, restrictions on material selection are also eased. Without limitation stemming from magnetic characteristics for exchange-coupling, a material with superior reproduction signal characteristics can be selected to form the reproduction layer 1. Besides, as optimization of multiple interference of light by varying a film thickness of the second interference layer 12 becomes possible, reproduction signals with great amplitudes can be obtained.

The foregoing causes a maximum C/N in Example 1 to further increase while more or less eases requirements of temperature distribution to realize the moving of magnetic domain walls, thereby ensuring expansion of an adequate range of the reproduction power. In other words, further high densification under the same conditions becomes possible.

[Second Embodiment]

Figure 3:
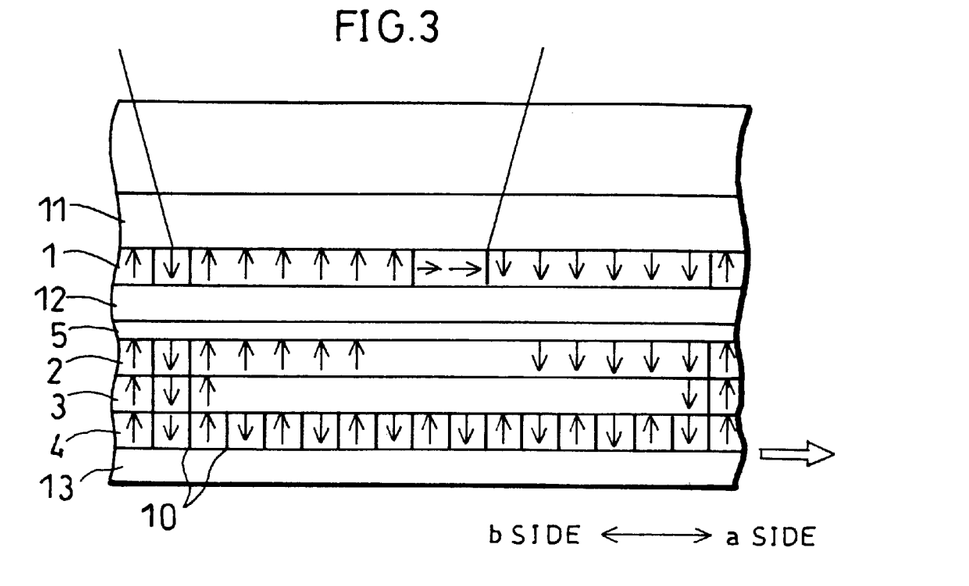
FIG. 3 is a schematic cross-sectional view illustrating a magneto-optical recording medium in accordance with a second embodiment of the present invention.

The following description will explain another embodiment of the present invention, while referring to FIG. 3. Incidentally, the members having the same structure (function) as those in the first embodiment will be designated by the same reference numerals and their description will be omitted.

① Structure of Magneto-optical Recording Medium

A magneto-optical recording medium of the second embodiment has the same structure as that of the first embodiment except that a metal or alloy with a high reflectance (reflection layer 5) is provided between the second interference layer 12 and the magnetic domain extending layer 2 (structure (A)).

FIG. 3 is a schematic cross-sectional view of the foregoing magneto-optical recording medium having the reflection layer 5 between the second interference layer 12 and the magnetic domain extending layer 2.

The reflection layer 5 may be formed with a material with a high reflectance, for example, Al, an Al alloy such as, AlNi, AlTa, AlTi, or AlCr, or Cu.

The provision of the reflection layer 5 ensures efficient reflection of light which has been transmitted through the reproduction layer 1 as explained in conjunction with the first embodiment, and besides, ensures optimization of multiple interference by adjusting the thickness of the second interference layer 12. As a result, signal characteristics further superior to those in the first embodiment can be obtained.

Note that the effects can be achieved by conducting the transfer of extended magnetic domains from the magnetic domain extending layer 2 to the reproduction layer 1 by magnetostatic coupling, and that the reflection layer 5 is preferably made of a non-magnetic material.

Furthermore, the magneto-optical recording medium of the present embodiment may be arranged so that the second interference layer 12 is formed with a metal or an alloy with a high reflectance (reflection layer 5) (structure (B)).

② Concrete Examples

The following description will show concrete examples of a magneto-optical recording medium of the second embodiment.

EXAMPLE 2

As a magneto-optical recording medium in the foregoing structure (A), a medium was produced so as to have: a first interference layer 11 made of AlN, 70 nm thick; a reproduction layer 1 made of GdFeCo, 20 nm thick, having a Curie temperature Tc1 higher than 300° C.; a second interference layer 12 made of AlN, 20 nm thick; a reflection layer 5 made of AlNi, 15 nm thick; a magnetic domain extending layer 2 made of GdFeCo, 30 nm thick, having a Curie temperature Tc2 of 160° C.; an intermediate layer 3 made of TbFeCo, 10 nm thick, having a Curie temperature Tc3 of 70° C.; a recording layer 4 made of TbFeCo, 30 nm thick, having a Curie temperature Tc4 of 230° C.; and a protective layer 13 made of AlN, 20 nm thick.

EXAMPLE 3

As a magneto-optical recording medium in the foregoing structure (B), a medium was produced in the same structure as that of Example 2 except that the second interference layer 12 was omitted, that is, a medium was produced so as to have: a first interference layer 11 made of AlN, 70 nm thick; a reproduction layer 1 made of GdFeCo, 20 nm thick, having a Curie temperature Tc1 higher than 300° C.; no second interference layer 12; a reflection layer 5 made of AlNi, 15 nm thick; a magnetic domain extending layer 2 made of GdFeCo, 30 nm thick, having a Curie temperature Tc2 of 160° C.; an intermediate layer 3 made of TbFeCo, 10 nm thick, having a Curie temperature Tc3 of 70° C.; a recording layer 4 made of TbFeCo, 30 nm thick, having a Curie temperature Tc4 of 230° C.; and a protective layer 13 made of AlN, 20 nm thick.

Regarding the foregoing Examples 2 and 3, and samples differing in thickness of the second interference layer 12, characteristics were evaluated. The evaluation was carried out in the same manner as that in the case of the first embodiment. The outcome of evaluation is shown in Table 2 below.

TABLE 2

| FILM THICKNESS OF SECOND INTERFERENCE LAYER 12 (nm) | C/N (dB) | REMARKS |
| --- | --- | --- |
| 0 | 38.0 | COMPARATIVE EXAMPLE 1 (WITHOUT REPRODUCTION LAYER) |
| 0 | 41.0 | COMPARATIVE EXAMPLE 2 |
| 20 | 42.5 | EXAMPLE 1 (WITHOUT REFLECTION LAYER) |
| 0 | 41.5 | EXAMPLE 3 |
| 5 | 42.0 | |
| 10 | 42.5 | |
| 20 | 43.0 | EXAMPLE 2 |
| 30 | 43.0 | |
| 50 | 41.5 | |
| 70 | 39.0 | |
| 100 | 29.0 | |

The result of evaluation shows that in the case of Example 2, a maximum C/N was about 2.5 dB higher, and an adequate range of reproduction power for obtaining a C/N of not less than 40 dB was about 15 percent broader, as compared with Comparative Example 2. Besides, reproduction signal characteristics superior to those in the conventional cases were obtained when the second interface layer 12 had a film thickness in a range of 0 nm to 50 nm (0 nm in Example 3).

In Examples 2 and 3, the provision of the reflection layer 5 enables efficient reflection of light having been transmitted through the reproduction layer 1, thereby ensuring that Examples 2 and 3 achieve an increase in the quantity of light used in multiple interference, in addition to the advantages mentioned in the description of Example 1. In result, reproduction signals with great amplitudes compared with the conventional cases can be obtained. Incidentally, in Example 3, the second interference layer 12 is absent, but the presence of the reflection layer 5 enables magnetostatic coupling from the magnetic domain extending layer 2 to the reproduction layer 1. Therefore, better characteristics than those in Example 2 can be obtained.

As described above, with the magneto-optical recording medium of the present embodiment, the maximum C/N can be further raised. Besides, since the requirements of the temperature distribution for realizing the moving of magnetic domain walls are eased to some extent, the adequate range of the reproduction power can be broadened. In other words, further high densification is made possible under the same conditions.

Incidentally, since magnetic domains are transferred by magnetostatic coupling of the magnetic domain extending layer 2 with the reproduction layer 1, provision of the two layers at a greater distance leads to a decrease in the force of magnetostatic coupling. Therefore, to meet the requirements of forming the reflection layer 5 thin as well as ensuring efficient reflection, the reflection layer 5 is formed 15 nm thick in the second embodiment. The thickness of the reflection layer 5, however, is not limited to this, but the reflection layer 5 may have any thickness as long as it is optimal to meet the requirements relating to the magnetostatic coupling and the reflectance.

(Modifications)

The present invention is characterized in that magnetization information in the recording layer is extended in the magnetic domain extending layer and the extended magnetic domain is transferred to the reproduction layer by magnetostatic coupling, and it may be modified into not only the first or second embodiment described above, but also any embodiment as long as it has the foregoing characteristics. The following description will depict some modifications, while referring to FIGS. 4 through 8.

① Magnetic Domain Extending Layer

The magnetic domain extending layer 2 used in the foregoing first and second embodiments are not limited to those in the first and second embodiments as long as it has the following functions (i) through (iii).

(i) In a region at a temperature in a range from room temperature to a predetermined temperature (a temperature in the vicinity of the Curie temperature Tc3 of the third magnetic layer (intermediate layer 3)), the magnetic domain extending layer 2 is exchange-coupled with small recording magnetic domains in the recording layer 4.

(ii) In a region at a temperature in a range from the foregoing predetermined temperature to the second critical temperature, magnetic domain walls in the magnetic domain extending layer 2 move thereby leading to extension of a magnetic domain.

(iii) In a region at a temperature above the second critical temperature, the magnetic domain walls stop moving, thereby preventing an extended magnetic domain of a magnetic domain heated to Tc3, ahead in the medium moving direction, from entering the beam spot.

Incidentally, in the arrangement shown in FIG. 1, the second critical temperature is the Curie temperature Tc2 of the magnetic domain extending layer 2.

Figure 4:
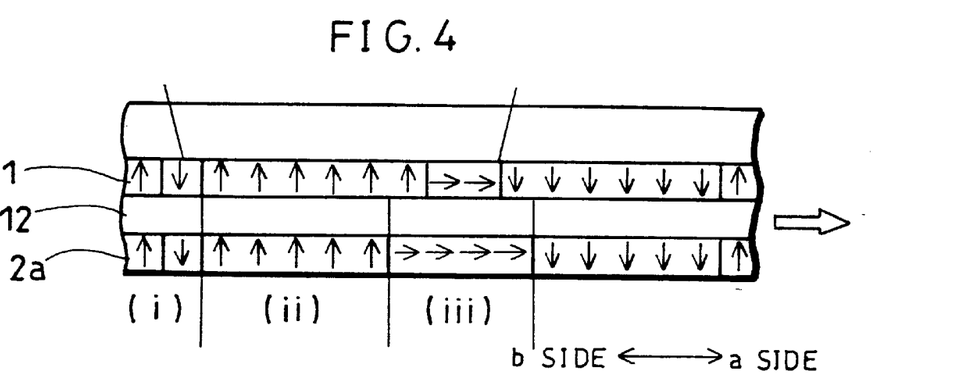
FIG. 4 is a schematic cross-sectional view illustrating a modification of a magnetic domain extending layer of the present invention.

Adaptable as the magnetic domain extending layer having the foregoing functions is a magnetic domain extending layer 2a shown in FIG. 4, apart from those of the first and second embodiments. In other words, the magnetic domain extending layer may be the magnetic domain extending layer 2a which becomes in an in-plane magnetization state at a temperature not lower than the second critical temperature. In this structure, a magnetic domain wall moving from ahead in the medium moving direction (from the a side) which leads to generation of noise can be stopped by the in-plane magnetization state, so as not to enter the beam spot.

② Reproduction Layer

The following description will explain another example of the reproduction layer 1 in the first and second embodiments.

Among the magnetic domains in regions of the magnetic domain extending layer 2 exhibiting the foregoing functions (i) through (iii) (hereinafter referred to as regions (i) through (iii)), only the extended magnetic domain in the region (ii) is transferred to the reproduction layer 1 and becomes a reproduction signal, whereas the other referred magnetic domains become noise. Therefore, the reproduction layer, which transfers the extended magnetic domain in the region (ii), is preferably capable of masking signals in a region at temperatures in a range from room temperature to Tc3 and a region at a temperature not lower than the second critical temperature so as to reduce noise. Examples of such a reproduction layer include reproduction layers 1a through 1d shown in FIGS. 5 through 8.

Figure 5:
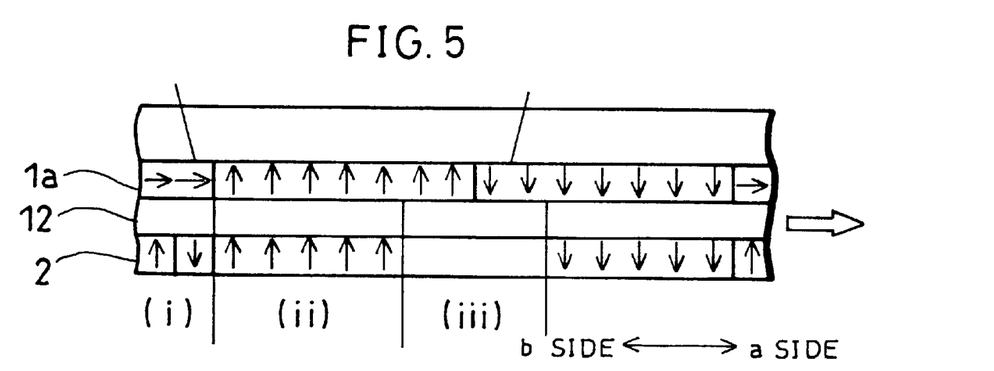
FIG. 5 is a schematic cross-sectional view illustrating a modification of a reproduction layer of the present invention.

The reproduction layer 1a shown in FIG. 5 exhibits an in-plane magnetization state in a temperature range from room temperature to Tc3, and becomes in a perpendicular magnetization state at a temperature above Tc3. With this, in a region heated to a temperature in a range from room temperature to Tc3, magnetization information in the magnetic domain extending layer 2 can be masked due to the in-plane magnetization state.

Figure 6:
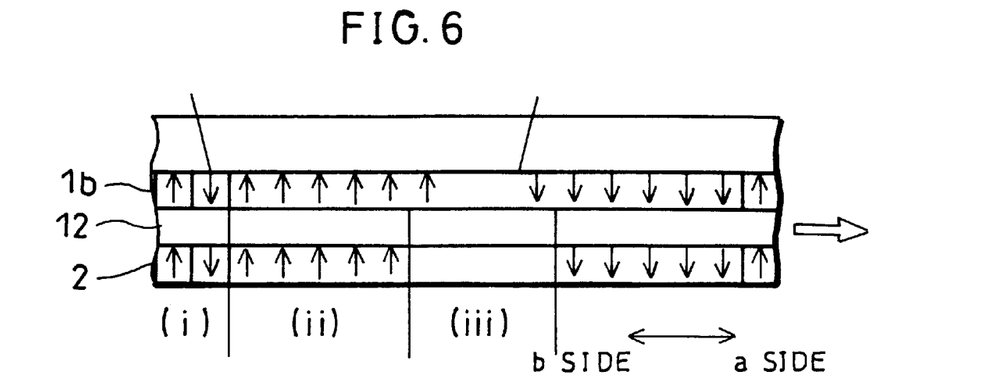
FIG. 6 is a schematic cross-sectional view illustrating another modification of the reproduction layer of the present invention.

The reproduction layer 1b shown in FIG. 6 has a Curie temperature set to a temperature (first critical temperature) which is in the vicinity of the second critical temperature or slightly higher than that, and at a temperature not lower than the vicinity of the foregoing temperature the reproduction layer 1b loses magnetic order thereby masking information in the recording layer 4.

Figure 7:
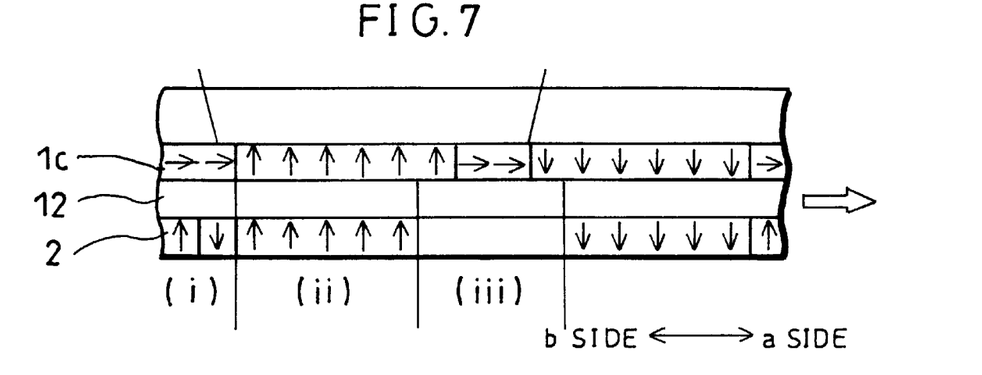
FIG. 7 is a schematic cross-sectional view illustrating still another modification of the reproduction layer of the present invention.

The reproduction layer 1c shown in FIG. 7 exhibits an in-plane magnetization state in a temperature range from room temperature to Tc3, becomes in a perpendicular magnetization state at a temperature higher than Tc3, and becomes in an in-plane magnetization state at a temperature (first critical temperature) which is in the vicinity of the second critical temperature or slightly higher than that. With this, in a region at a temperature in a range from room temperature to Tc3 and a region at a temperature not lower than the vicinity of the second critical temperature, magnetization information in the magnetic domain extending layer 2 can be masked due to the in-plane magnetization state.

Figure 8:
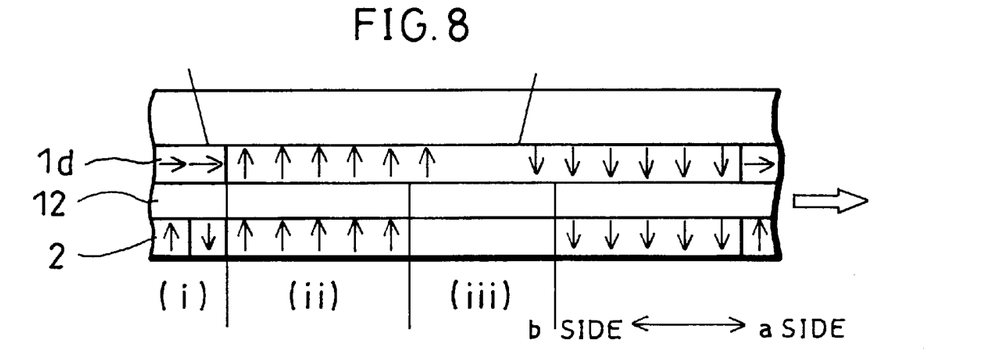
FIG. 8 is a schematic cross-sectional view illustrating still another modification of the reproduction layer of the present invention.

The reproduction layer 1d shown in FIG. 8 exhibits an in-plane magnetization state in a temperature range from room temperature to Tc3, exhibits a perpendicular magnetization state at a temperature not lower than Tc3, and has a Curie temperature set to a temperature (first critical temperature) which is in the vicinity of the second critical temperature or slightly higher than that. With this, in a region at a temperature in a range from room temperature to Tc3, magnetization information in the magnetic domain extending layer 2 can be masked due to the in-plane magnetization, while in a region at a temperature not lower than the vicinity of the second critical temperature, information in the recording layer 4 can be masked since magnetic order is lost.

As described above, since the magneto-optical recording medium of the present invention is arranged so that a magnetic domain extended in the magnetic domain extending layer (second magnetic layer) is further transferred to the reproduction layer (first magnetic layer) by magnetostatic coupling and is read therefrom, selection of material for each magnetic layer is made easier, and information reading with reproduction signals of excellent quality can be realized. Further, by adjusting the film thickness of the non-magnetic intermediate layer between the magnetic domain extending layer and the reproduction layer, multiple interference of light is optimized, thereby ensuring that reproduction signals with great amplitudes can be obtained.

Furthermore, by directing the sub-lattice magnetizations of the reproduction layer and the magnetic domain extending layer in the same direction upon reproduction, great magneto-optical effects can be obtained by utilizing multiple interference of light.

As described above, a magneto-optical recording medium of the present invention, which includes at least a recording layer for recording information and a magnetic domain extending layer in which an extended magnetic domain is formed by transfer by exchange-coupling and extension of magnetization information of the recording layer, may be arranged so as to include a reproduction layer to which the extended magnetic domain in the magnetic domain extending layer is transferred by magnetostatic coupling.

A magneto-optical recording medium of the present invention has at least a first magnetic layer, a second magnetic layer, a third magnetic layer, a fourth magnetic layer, and a protective layer in this order, the second magnetic layer having a poor frictional force due to magnetic domain wall coercivity compared with the other magnetic layers, the third magnetic layer having a lower Curie temperature compared with the other magnetic layers, the fourth magnetic layer being a perpendicular magnetization film having a greater coercive force at room temperature compared with the first magnetic layer, the second, third, and fourth magnetic layers being exchange-coupled, and the magneto-optical recording medium may be arranged so as to include a non-magnetic intermediate layer between the first magnetic layer and second magnetic layer.

The magneto-optical recording medium of the present invention may be arranged so that the first magnetic layer is a magnetic layer assuming a perpendicular magnetization state at least at a temperature not lower than Tc3 and lower than the first critical temperature, and either assuming an in-plane magnetization state or otherwise losing magnetization at a temperature not lower than the first critical temperature, where Tc3 is a Curie temperature of the third magnetic layer.

The magneto-optical recording medium of the present invention may be arranged so that the second magnetic layer is a magnetic layer assuming a perpendicular magnetization state at least at a temperature not lower than Tc3 and lower than a second critical temperature, and either assuming an in-plane magnetization state or otherwise losing magnetization at a temperature not lower than the second critical temperature, where Tc3 is a Curie temperature of the third magnetic layer.

The magneto-optical recording medium of the present invention may be arranged so that (i) the first magnetic layer is a magnetic layer assuming a perpendicular magnetization state at least at a temperature not lower than Tc3 and lower than a first critical temperature, and either assuming an in-plane magnetization state or otherwise losing magnetization at a temperature higher than the first critical temperature, (ii) the second magnetic layer is a magnetic layer assuming a perpendicular magnetization state at least at a temperature not lower than Tc3 and lower than a second critical temperature, and either assuming an in-plane magnetization state or otherwise losing magnetization at a temperature not lower than the second critical temperature, and (iii) the first critical temperature is substantially equal to the second critical temperature, or higher than the second critical temperature, where Tc3 is a Curie temperature of the third magnetic layer.

The magneto-optical recording medium of the present invention may be arranged so that (i) the first magnetic layer and the second magnetic layer are both made of rare earth-transition metal element amorphous alloys, and (ii) in a temperature range from room temperature to the second critical temperature, the first magnetic layer and the second magnetic layer have a same polarity of sub-lattice magnetization.

The magneto-optical recording medium of the present invention may be arranged so as to further include a reflection layer made of a metal or an alloy having a high reflectance, between the non-magnetic intermediate layer and the second magnetic layer.

The magneto-optical recording medium of the present invention may be arranged so that the non-magnetic intermediate layer is a reflection layer made of a metal or an alloy having a high reflectance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, comprising:
   a recording layer in which a plurality of recording magnetic domains are formed;
   a first exchange-coupling breaking layer for breaking exchange-coupling with said recording layer at a temperature not lower than a predetermined temperature;
   a magnetic domain extending layer in which, upon the breaking of exchange-coupling with said recording layer, a magnetic domain wall moves to a higher-temperature side so that an extended magnetic domain is formed; and
   a second exchange-coupling breaking layer for breaking exchange-coupling between said magnetic domain extending layer and a reproduction layer, while making said two layers magnetostatically coupled.

2. The magneto-optical recording medium set forth in claim 1, wherein:
   said reproduction layer and said magnetic domain extending layer are made of rare earth-transition metals; and
   at least in a temperature range from room temperature to a Curie temperature of said magnetic domain extending layer, said reproduction layer and said magnetic domain extending layer have sub-lattice magnetizations with a same polarity.

3. The magneto-optical recording medium set forth in claim 1, wherein said reproduction layer has a Curie temperature higher than a Curie temperature of said recording layer.

4. The magneto-optical recording medium set forth in claim 3, wherein the Curie temperature of said reproduction layer is higher than the Curie temperature of said magnetic domain extending layer.

5. The magneto-optical recording medium set forth in claim 1, further comprising a reflection layer provided between said magnetic domain extending layer and said second exchange-coupling breaking layer.

6. The magneto-optical recording medium set forth in claim 5, wherein said reflection layer is made of a non-magnetic material.

7. The magneto-optical recording medium set forth in claim 1, wherein:
at a temperature not higher than a Curie temperature of said first exchange-coupling breaking layer, said magnetic domain extending layer is exchange-coupled with the recording magnetic domains in said recording layer;
in a temperature range from the Curie temperature of said first exchange-coupling breaking layer to a Curie temperature of said magnetic domain extending layer, a magnetic domain wall in said magnetic domain extending layer moves, to extend a magnetic domain; and
at a temperature not lower than the Curie temperature of said magnetic domain extending layer, the magnetic domain wall stops moving.

8. The magneto-optical recording medium set forth in claim 1, wherein:
at a temperature in a range from a Curie temperature of said first exchange-coupling breaking layer to a first critical temperature, said reproduction layer is in a perpendicular magnetization state; and
at a temperature not lower than the first critical temperature, said reproduction layer masks information in said recording layer.

9. The magneto-optical recording medium set forth in claim 8, wherein, at a temperature not lower than the first critical temperature, said reproduction layer is in an in-plane magnetization state.

10. The magneto-optical recording medium set forth in claim 8, wherein the first critical temperature is the Curie temperature of said reproduction layer.

11. A magneto-optical recording medium having at least a recording layer for recording information and a magnetic domain extending layer in which an extended magnetic domain is formed by transfer of magnetization information of said recording layer by exchange-coupling and extension of the same, said magneto-optical recording medium comprising:
a reproduction layer to which the extended magnetic domain in said magnetic domain extending layer is transferred by magnetostatic coupling.

12. A magneto-optical recording medium having at least a first magnetic layer, a second magnetic layer, a third magnetic layer, a fourth magnetic layer, and a protective layer in this order, said second magnetic layer having a weak frictional force due to magnetic domain wall coercivity compared with the other magnetic layers, said third magnetic layer having a lower Curie temperature compared with the other magnetic layers, said fourth magnetic layer being a perpendicular magnetization film having a greater coercive force at room temperature compared with said first magnetic layer, said second, third, and fourth magnetic layers being exchange-coupled,
said magneto-optical recording medium comprising a non-magnetic intermediate layer between said first magnetic layer and second magnetic layer.

13. The magneto-optical recording medium set forth in claim 12, wherein, a Curie temperature of said third magnetic layer being referred to as Tc3:
said first magnetic layer is a magnetic layer assuming a perpendicular magnetization state at least at a temperature not lower than Tc3 and lower than a first critical temperature, and either assuming an in-plane magnetization state or otherwise losing magnetization at a temperature not lower than the first critical temperature.

14. The magneto-optical recording medium set forth in claim 12, wherein, a Curie temperature of said third magnetic layer being referred to as Tc3:
said second magnetic layer is a magnetic layer assuming a perpendicular magnetization state at least at a temperature not lower than Tc3 and lower than a second critical temperature, and either assuming an in-plane magnetization state or otherwise losing magnetization at a temperature not lower than the second critical temperature.

15. The magneto-optical recording medium set forth in claim 12, wherein, a Curie temperature of said third magnetic layer being referred to as Tc3:
said first magnetic layer is a magnetic layer assuming a perpendicular magnetization state at least at a temperature not lower than Tc3 and lower than a first critical temperature, and either assuming an in-plane magnetization state or otherwise losing magnetization at a temperature not lower than the first critical temperature;
said second magnetic layer is a magnetic layer assuming a perpendicular magnetization state at least at a temperature not lower than Tc3 and lower than a second critical temperature, and either assuming an in-plane magnetization state or otherwise losing magnetization at a temperature not lower than the second critical temperature; and
the first critical temperature is substantially equal to the second critical temperature, or higher than the second critical temperature.

16. The magneto-optical recording medium set forth in claim 15, wherein:
said first magnetic layer and said second magnetic layer are both made of rare earth-transition metal element amorphous alloys; and
at least in a temperature range from room temperature to the second critical temperature, said first magnetic layer and said second magnetic layer have a same polarity of sub-lattice magnetization.

17. The magneto-optical recording medium set forth in claim 12, further comprising a reflection layer made of a metal or an alloy having a high reflectance, between said non-magnetic intermediate layer and said second magnetic layer.

18. The magneto-optical recording medium set forth in claim 12, wherein said non-magnetic intermediate layer is a reflection layer made of a metal or an alloy having a high reflectance.

19. A method for reproducing a magneto-optical recording medium, comprising the steps of:
transferring a recording magnetic domain in a recording layer to a magnetic domain extending layer, and extending the recording magnetic domain; and
transferring the recording magnetic domain thus extended to a reproduction layer by magnetostatic coupling.

* * * * *